United States Patent Office 2,936,219
Patented May 10, 1960

2,936,219

PRODUCTION OF CHLORINE DIOXIDE

William Howard Rapson, Toronto, Ontario, Canada, assignor to Hooker Chemical Corporation, Niagara Falls, N.Y., a corporation of New York No Drawing. Application February 18, 1957
Serial No. 640,620

4 Claims. (Cl. 23—152)

This invention relates to the production of chlorine dioxide, and more particularly to an improvement in the production of chlorine dioxide from chlorates in acid solution.

The method of manufacturing chlorine dioxide from chlorates in acid solution is well known in the art. The principal methods in use together with the reactions involved are collected, described and analyzed in a paper entitled "A Comparison of Processes for the Generation of Chlorine Dioxide in Pulp Mills," published in "Tappi," vol. 37, No. 4, April 1954, pp. 129–137.

It is the principal object of this invention to provide an improvement in the method of producing chlorine dioxide from chlorates in acid solutions whereby a greater efficiency of production may be achieved, and a greater proportion of the chlorate reduced to chlorine dioxide than has heretofore been the case.

My invention consists broadly in the addition, to the chlorate from which chlorine dioxide is to be produced, of a quantity of chloride as hereinafter described in detail.

In an earlier disclosure, Serial No. 493,050, now Patent No. 2,863,722, I have disclosed a process for the manufacture of chlorine dioxide from a chlorate and a chloride in substantially equimolar ratio in acid solution, without the use of any other reducing agent. According to the method of this invention, an efficiency of 98 to 99% of the theoretical chlorine dioxide available from the chlorate could be achieved.

I have now discovered that the chemical reactions involved in this process, which lead to the high degree of recovery therein, may also be involved in all other methods of producing chlorine dioxide from chlorates in acid solution, and that the addition of a quantity of chloride to the chlorate will appreciably increase the efficiency of chlorine dioxide production.

In processes of manufacturing chlorine dioxide of which I am aware, small concentrations of chloride may be found in the generating solution. The presence of this chloride, when it has been detected and recorded, has generally been attributed to undesirable side reactions.

I have discovered, however, that the presence of chloride is not merely incidental, but is rather necessary for the production of chlorine dioxide from chlorates. In the complete absence of chloride, no chlorine dioxide will be produced, and when pure chlorate is used for the production of chlorine dioxide, the necessary chloride is formed by reduction of the chlorate to chloride, and then chlorine dioxide is produced.

When the effluent from any chlorine dioxide generator goes to waste, the chloride which remains in it normally represents a loss of the chlorate from which it was produced. The addition of some chloride to the chlorate used for the manufacture of chlorine dioxide avoids the wastage of that portion of the chlorate which is normally consumed in forming the chloride needed for the production of chlorine dioxide. Since the chlorate is a more expensive chemical, the addition of some chloride thus improves the economy of the process.

In all processes for manufacturing chlorine dioxide some chlorine is produced simultaneously. When pure chlorates are used as the starting material, the chlorine produced must obviously arise from part of the chlorate, and therefore such chlorine represents an additional loss of chlorate which is then not available for producing chlorine dioxide. When sufficient chloride is added with the chlorate, most of the chlorine produced arises from the chloride added, and this represents an additional saving of chlorate, further increasing the efficiency of the process.

Although my invention is not to be construed as limited to any statement of theory, it is postulated that the following reactions represent the formation of chlorine dioxide from chlorates by all processes:

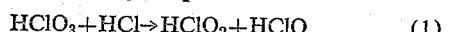
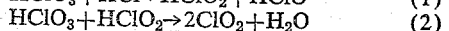
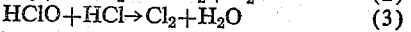

$$HClO_3 + HCl \rightarrow HClO_2 + HClO \quad (1)$$
$$HClO_3 + HClO_2 \rightarrow 2ClO_2 + H_2O \quad (2)$$
$$HClO + HCl \rightarrow Cl_2 + H_2O \quad (3)$$

In the absence of any other reducing agent these reactions produce two moles of chlorine dioxide for each mole of chlorine. When other reducing agents than chloride are used to produce chlorine dioxide, much less chlorine is evolved, because such reducing agents serve principally to reduce either hypochlorous acid or chlorine to chloride to maintain the above reactions and to minimize the production of chlorine. For example:

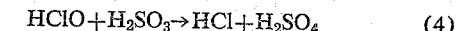
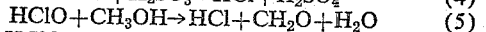

$$HClO + H_2SO_3 \rightarrow HCl + H_2SO_4 \quad (4)$$
$$HClO + CH_3OH \rightarrow HCl + CH_2O + H_2O \quad (5)$$
$$HClO + CH_2O \rightarrow HCl + HCOOH + H_2O \quad (6)$$

Sulphurous acid, methanol and formaldehyde are merely some reducing agents which are capable of bringing about this reduction. Many other reducing agents are also suitable.

If insufficient chloride is present to maintain reactions (1) and (2), the reducing agent will reduce chlorate to chloride until the concentration of the latter is adequate to maintain the production of chlorine dioxide at the required rate.

Chlorine is thus produced along with chlorine dioxide in all processes to an extent determined by the competition between reaction (3) and reactions such as (4), (5) or (6).

Since according to this hypothesis the chlorine dioxide is produced from chlorate and the chlorine from chloride, which is in turn produced from chlorate if it is not provided from another source, the addition of some chloride with the chlorate makes it unnecessary for the chloride needed for reactions (1) and (3) to be obtained from chlorate. Therefore, with all other reducing agents, the addition of some chloride with the chlorate increases the efficiency of production of chlorine dioxide from the chlorate.

The addition of chloride may increase the amount of chlorine produced, but since such chlorine arises from the chloride and not from the chlorate, this does not represent a loss of efficiency.

It is obvious that a solution containing sodium chloride and sulphuric acid is equivalent to a solution of hydrochloric acid, and hydrochloric acid therefore could be substituted for sodium chloride in order to obtain the chloride necessary to improve the efficiency of former processes.

Although sodium chlorate and sulphuric acid are usually used for the production of chlorine dioxide, and sodium chloride or hydrochloric acid would be the most economical source of chloride for the improvement described herein, any other soluble metal chloride could be added to any soluble metal chlorate or chloric acid used with any other strong acid, such as for example phosphoric acid.

The following examples of actual tests conducted will assist in an appreciation of the invention.

Example 1

A chlorine dioxide generator consisting of a cylindrical glass vessel containing two litres of solution, equipped with a tube for introducing a continuous stream of sodium chlorate solution, another tube for introducing a continuous stream of sulphuric acid, a tube for introducing a gaseous mixture of sulphur dioxide and/or air into the solution through a sintered glass plate, an outlet tube in the top of the vessel to conduct the chlorine dioxide, chlorine and air away from the generator, and an overflow tube through which the effluent solution is conducted to waste to maintain constant volume of liquid in the generator, was used to carry out three separate experiments in which the generator was operated continuously using a feed solution containing substantially pure sodium chlorate in one case, and containing two different amounts of sodium chloride added to the sodium chorate in the other two cases. The following average conditions were maintained:

|  | A | B | C |
|---|---|---|---|
| Molarity of sodium chlorate in feed solution | 4.80 | 4.70 | 4.68 |
| Molarity of sodium chloride in feed solution | 0.00 | 0.38 | 0.66 |
| Weight ratio sodium chloride to sodium chlorate | 0.00 | 0.045 | 0.078 |
| Rate of feed of sodium chlorate, millimoles per minute per litre of generator solution | 2.99 | 2.41 | 2.55 |
| Rate of feed of sodium chloride, same units | 0.00 | 0.21 | 0.41 |
| Rate of feed of $SO_2$ (as 8% by vol. in air), same units | 1.17 | 0.58 | 0.58 |
| Rate of feed of 15 molar $H_2SO_4$, same units | 2.41 | 3.41 | 3.75 |
| Rate of production of $ClO_2$, mm./min./l. gen. soln | 2.22 | 2.06 | 2.24 |
| Rate of production of $Cl_2$, mm./min./l. gen. soln | 0.27 | 0.19 | 0.26 |
| Rate of consumption of $NaClO_3$, mm./min./l. gen. soln | 2.78 | 2.26 | 2.40 |
| Generator solution concentrations: | | | |
| $ClO_3^-$, molar | 0.264 | 0.205 | 0.186 |
| $Cl^-$, molar | 0.036 | 0.044 | 0.058 |
| $H^+$, normal | 9.7 | 9.1 | 9.1 |
| Efficiency = $\left(\dfrac{\text{Moles } ClO_2 \text{ formed}}{\text{Moles } NaClO_3 \text{ consumed}} \times 100\right)$ | 79.8 | 91.2 | 93.4 |
| Yield = $\left(\dfrac{\text{Moles } ClO_2 \text{ formed}}{\text{Moles } NaClO_3 \text{ introduced}} \times 100\right)$ | 74.3 | 85.5 | 87.8 |

Temperature was maintained at 35° C. in all cases.

This example shows that when a chlorine dioxide generator is operating relatively inefficiently, as in case A, a large improvement in efficiency and in yield may be obtained by adding sodium chloride to the sodium chlorate to the generator, as in case B.

Example 2

A similar chlorine dioxide generator of 15.8 litres capacity was operated continuously at 35° C. without added sodium chloride in the sodium chlorate solution, and with 7% of the weight of the sodium chlorate as added sodium chloride. The following average conditions were maintained:

|  | D | E |
|---|---|---|
| Molarity of sodium chlorate in feed solution | 6.00 | 6.00 |
| Molarity of sodium chloride in feed solution | 0.0 | 0.76 |
| Weight ratio sodium chloride to sodium chlorate | 0.0 | 0.07 |
| Rate of feed of $NaClO_3$, millimoles/min./litre of generator solution | 1.38 | 1.58 |
| Rate of feed of NaCl, mm./min./l. gen. soln | 0.00 | 0.20 |
| Rate of feed of $H_2SO_4$ (15 molar) mm./min./l. | 0.83 | 1.28 |
| Rate of feed of $SO_2$ (9.5% by vol. in air) mm./min./l. gen. soln | 0.95 | 0.95 |
| Rate of production of $ClO_2$, mm./min./l. gen. soln | 1.22 | 1.48 |
| Rate of production of $Cl_2$, mm./min./l. gen. soln | 0 | 0.14 |
| Rate of consumption of $NaClO_3$, mm./min./l | 1.33 | 1.53 |
| Generator solution concentrations: | | |
| $ClO_3^-$, molar | 0.150 | 0.147 |
| $Cl^-$, molar | 0.060 | 0.103 |
| $H^+$, normal | 9.21 | 8.88 |
| Efficiency (defined in Example 1), percent | 91.5 | 96.6 |
| Yield (defined in Example 1), percent | 88.6 | 93.5 |

This example shows that when a chlorine dioxide generator is operating relatively efficiently, as in case D, a small but still significant improvement in efficiency and in yield may be expected by adding sodium chloride with the sodium chlorate fed to the generator, as in case E.

Example 3

The same chlorine dioxide generator as in example 2 was operated continuously at 35° C. with a feed solution having a much lower concentration of sodium chlorate, and with a very much lower concentration of sodium chlorate in the generator solution. In a second experiment 28% of the weight of the sodium chlorate as sodium chloride was added to the feed solution. The average operating conditions in the two cases were:

|  | F | G |
|---|---|---|
| Molarity of sodium chlorate in feed solution | 0.200 | 0.210 |
| Molarity of sodium chloride in feed solution | 0.00 | 0.103 |
| Weight ratio sodium chloride to sodium chlorate | 0.00 | 0.28 |
| Molarity of sulphuric acid in feed solution | 5.2 | 5.0 |
| Rate of feed of $NaClO_3$, millimoles/minute/litre of generator solution | 1.76 | 1.69 |
| Rate of feed of NaCl, mm./min./l. gen. soln | 0.00 | 0.434 |
| Rate of feed of $SO_2$ (8% by. vol. in air), mm./min./l. gen. soln | 2.59 | 1.01 |
| Rate of production of $ClO_2$, mm./min./l. gen. soln | 0.96 | 1.28 |
| Rate of production of $Cl_2$, mm./min./l. gen. soln | 0.002 | 0.037 |
| Rate of consumption of $NaClO_3$, mm./min./l. gen. soln | 1.71 | 1.66 |
| Generator solution concentrations: | | |
| $ClO_3^-$, molar | 0.020 | 0.022 |
| $Cl^-$, molar | 0.063 | 0.074 |
| $H^+$, normal | 5.2 | 5.0 |
| Efficiency, as defined in Example 1, percent | 56.1 | 77.1 |
| Yield, as defined in Example 1, percent | 54.5 | 75.7 |

This example shows that when the chlorate concentration in the generator is very low, the chloride concentration in the generator becomes very much higher in order to maintain the desired rate of production of chorline dioxide. This leads to low efficiency, since the required chloride must be obtained by reduction of chlorate, which is not then available for the production of chlorine dioxide (case F). When sufficient sodium chloride is added to the sodium chlorate solution being fed to the generator, much higher efficiency with respect to conversion of sodium chlorate to chlorine dioxide is obtained (case G).

All the examples show that the addition of as little as 4.5% of sodium chloride relative to the weight of sodium chlorate has the effect of greatly increasing the efficiency of the process.

The addition of any amount of chloride whatever will increase the efficiency of the process, and the more chloride added, the greater the increase in efficiency will be. It will be observed from Examples 1A, 1B and 1C, however, that the efficiency does not increase proportionately with the amount of chloride added, and while there is no theoretical upper limit on the amount of chloride to be added, the practical limit will be that quantity of chloride which, for given generator conditions, provides an efficiency of such a degree that the amount of chloride required to be added additionally is not justified economically by the further increase in efficiency to be expected.

It is obvious, however, that to provide a substantial increase in efficiency, a substantial amount of chloride must be added. By a substantial amount, I contemplate generally not less than 1 percent and not more than 30 percent chloride.

Thus, when here and elsewhere in the specification and claims I use the term a substantial amount of chloride or other substance, it is to be understood as meaning at least 1 percent.

The examples also show that the amount of chloride required to be added for an efficient process increases as the concentration of the chlorate decreases.

The invention has been illustrated by reference to examples and to certain theoretical reactions. It is to be understood, however, that these examples and reactions are offered by way of illustration only, and are not to be construed as limiting the invention. Such embodiments

What I claim as my invention is:

1. In a process for the production of chlorine dioxide from a chlorate and a reducing agent in acid solution, the improvement which comprises adding between 1% and 30% by weight of a chloride selected from the group consisting of metal chlorides and hydrochloric acid, to the reaction solution, said percentage being based upon the weight of chlorate present in the reaction mixture.

2. In a process for the production of chlorine dioxide from a metal chlorate and a reducing agent in acid solution, the improvement which comprises adding between 1% and 30% by weight of the chloride of such metal to the reaction solution, said percentage being based upon the weight of chlorate present in the reaction mixture.

3. In a process for the production of chlorine dioxide from sodium chlorate and a reducing agent in acid solution, the improvement which comprises adding between 1% and 30% by weight of sodium chloride to the acid solution, said percentage being based upon the weight of chlorate present in the reaction mixture.

4. In a process for the production of chlorine dioxide from sodium chlorate and a reducing agent in acid solution, the improvement which comprises adding between 1% and 30% by weight of hydrochloric acid to the reaction solution, said percentage being based upon the weight of chlorate present in the reaction mixture.

References Cited in the file of this patent

UNITED STATES PATENTS

| | | |
|---|---|---|
| 2,280,938 | Vincent | Apr. 28, 1942 |
| 2,317,443 | Cunningham | Apr. 27, 1943 |
| 2,390,432 | Evans | Dec. 4, 1945 |
| 2,833,624 | Sprauer | May 6, 1958 |